March 12, 1963 F. K. H. NALLINGER 3,080,704
INTERNAL COMBUSTION ENGINE WITH EXHAUST GAS TURBINE
Filed Aug. 2, 1957 2 Sheets-Sheet 1
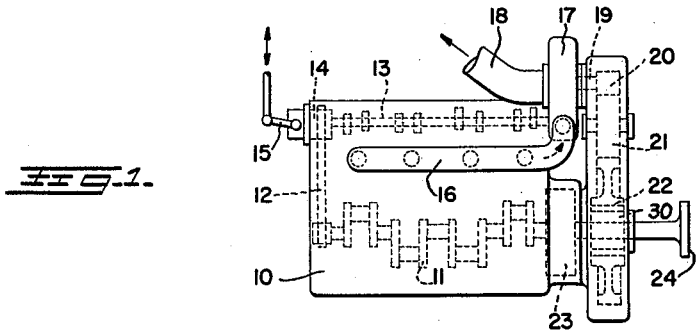
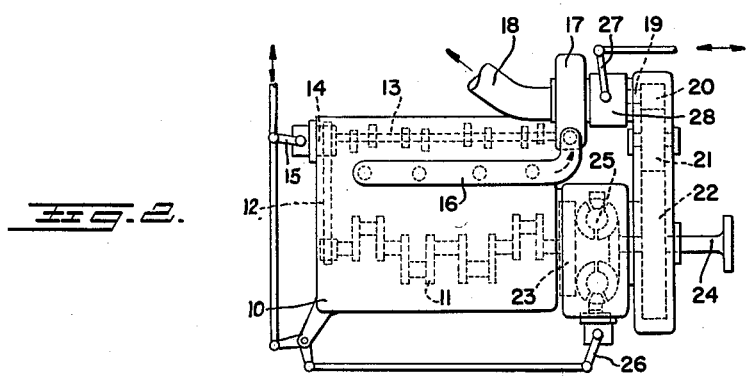
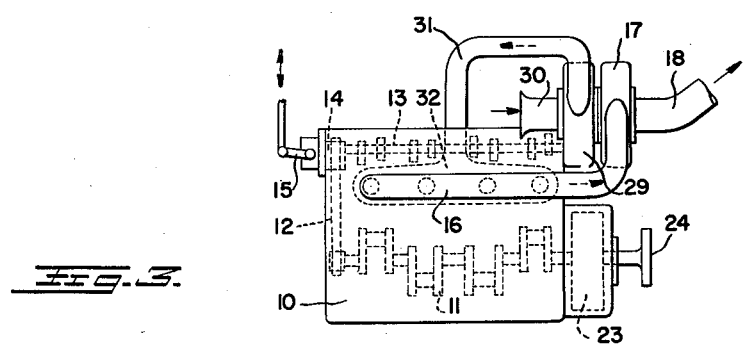
INVENTOR
FRIEDRICH K. H. NALLINGER
BY
ATTORNEYS

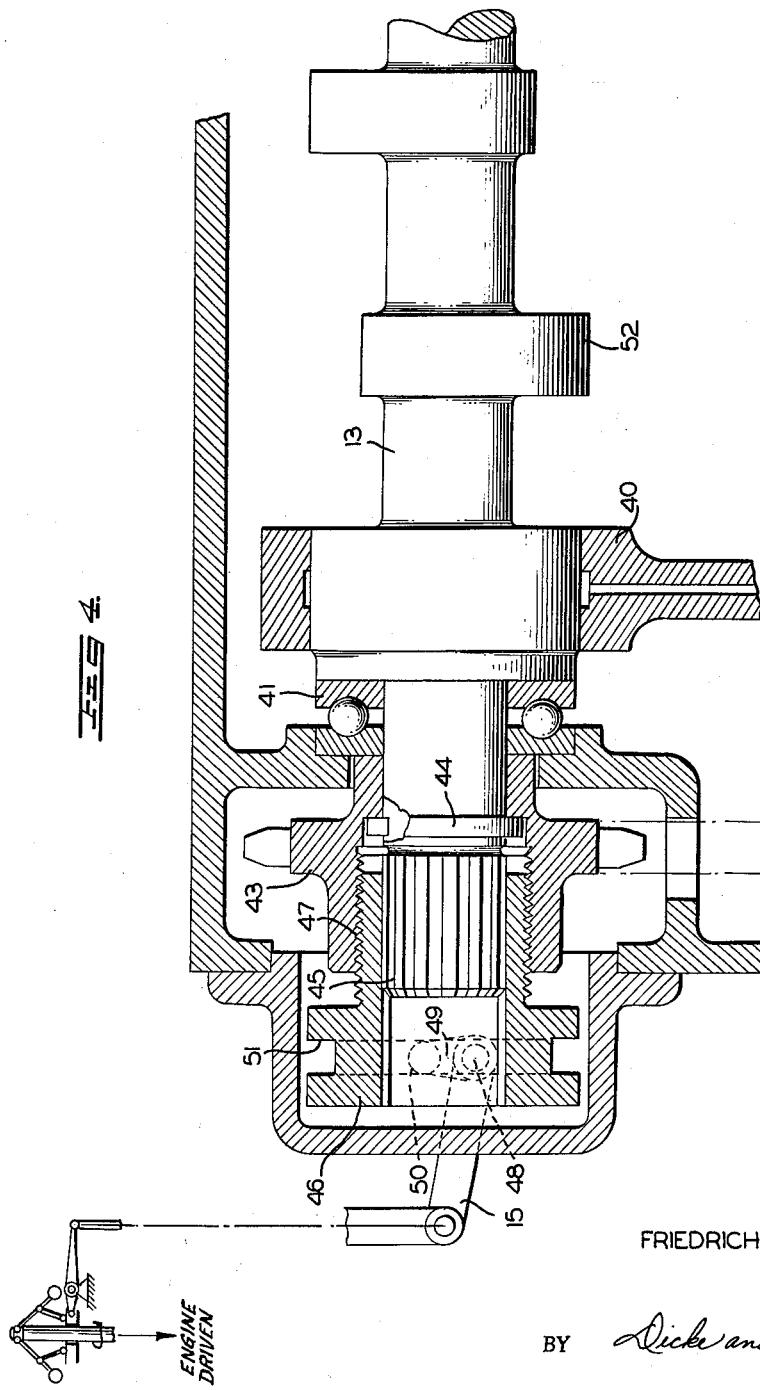

United States Patent Office 3,080,704
Patented Mar. 12, 1963

3,080,704
INTERNAL COMBUSTION ENGINE WITH
EXHAUST GAS TURBINE
Friedrich K. H. Nallinger, Stuttgart, Germany, assignor to Daimler-Benz Aktiengesellschaft, Stuttgart-Unterturkheim, Germany
Filed Aug. 2, 1957, Ser. No. 675,916
Claims priority, application Germany Aug. 11, 1956
14 Claims. (Cl. 60—13)

The present invention relates to a method and control arrangement for operating a piston-type internal combustion engine, especially for motor vehicles, provided with an exhaust gas turbine and an adjustable control mechanism for the piston-type internal combustion engine.

According to the present invention, it is proposed to adjust the timing control mechanism for the piston-type internal combustion engine with a decreasing rotational speed of the driven shaft of the installation in the sense or direction of greater loading of the exhaust gas turbine, for example, by changing the timing of the opening of the exhaust valves.

In this manner, it is possible, on the one hand, to maintain the output of the exhaust gas turbine as constant as possible which will reflect advantageously on the efficiency thereof since exhaust gas turbines can operate with a good degree of efficiency only over a relatively small range of output or loads and, on the other hand, to achieve that a relatively large torque is available at the driven or output side even with relatively small rotational speeds of the engine.

A piston-type internal combustion engine installation in accordance with the present invention in which the exhaust gas turbine is drivingly connected with the crankshaft over a gear or transmission, may be operated, for example, in such a manner that with an adjustment of the total externally given-off output of the over-all installation, the output of the exhaust gas turbine is maintained as constant as possible by adjusting the timing control of the piston-type internal combustion engine. In this manner, the degree of efficiency of the exhaust gas turbine may be maintained completely or nearly completely constant over a wide range of the total output produced by the over-all installation as a result of the constant loading of the exhaust turbine so that the over-all installation operates under very favorable conditions.

According to another embodiment, a piston-type internal combustion engine installation in accordance with the present invention, in which an adjustable transmission or change-speed gear, for example, a hydraulic torque converter is arranged between the crankshaft and the gear or transmission connecting the exhaust gas turbine with the output shaft is operated in such a manner that for purposes of achieving a relatively large torque with low rotational speeds of the driven side or output shaft of the over-all installation, especially during starting against a large resistance, the change-speed gear or adjustable transmission is adjusted to a very high speed reduction or possibly also to a complete separation of the input and output shafts thereof while the timing control mechanism is adjusted in the sense of as large as possible an energy transfer of the exhaust gases to the exhaust gas turbine. In that manner, the known performance characteristics of such turbines to produce with relatively low rotational speeds or standstill a very high torque may be utilized in an advantageous manner to relieve the transmission between the crankshaft and the driven side or output shaft of the over-all installation which ordinarily would be called upon to produce such high torques.

Moreover, the exhaust gas turbine of a piston-type internal combustion engine installation according to the present invention may also drive a charging device, preferably a turbo-charger. The operation may thereby be so arranged that for purposes of achieving a large torque with low rotational speeds of the internal combustion engine the adjustable timing control mechanism is adjusted in the sense of as large as possible an energy transfer of the exhaust gases to the exhaust gas turbine. In that manner, as in the preceding example, with slow rotational speeds a relatively large torque may be attained by reason of the fact that the strong reduction of the charging pressure which occurs ordinarily with the usual charging arrangements utilizing exhaust gas turbines, is avoided in accordance with the present invention with decreasing rotational speeds of the piston-type internal combustion engine.

Accordingly, it is an object of the present invention to provide a piston-type internal combustion engine installation with an exhaust gas turbine in which the efficiency of the exhaust gas turbine is maintained essentially constant or as constant as possible over a wide operating range of the internal combustion engine.

It is still another object of the present invention to provide an internal combustion engine installation with an exhaust gas turbine in which the overall efficiency is maintained high by operating the exhaust gas turbine within the range of high efficiency thereof notwithstanding changes in the rotational speeds of the internal combustion engine.

Still another object of the present invention resides in the provision of an installation for an internal combustion engine combined with an exhaust gas turbine in which a relatively large starting torque is produced by shifting a large energy transfer to the exhaust gas turbine during low rotational speeds or standstill of the driven side or output shaft and to thereby relieve the connection between the internal combustion engine and the driven side which may consist of a change-speed transmission such as a hydraulic torque converter.

A further object of the present invention is to provide an installation of a piston-type internal combustion engine with an exhaust gas turbine in which the exhaust gas turbine is subjected to essentially the same load notwithstanding variations in the output of the over-all installation so as to avoid decrease in efficiency of the over-all installation by reason of the unfavorable efficiency of an exhaust gas turbine when operating outside a predetermined range.

Another object of the present invention is to provide a piston-type internal combustion engine installation with an exhaust gas turbine driving a turbo charger which exhibits good efficiency by maintaining high the charging pressure produced by the turbo-charger even with low rotational speeds of the engine.

These and other objects, features and advantages of the present invention will become more obvious from the following description when taken in connection with the accompanying drawing which shows, for purposes of illustration only, several embodiments in accordance with the present invention and wherein:

FIGURE 1 illustrates a first embodiment of an internal combustion engine of the piston type provided with an exhaust gas turbine in accordance with the present invention in which the exhaust gas turbine is connected with the crankshaft over a mechanical gear or transmission;

FIGURE 2 is a modified embodiment similar to FIGURE 1 of an internal combustion engine with an exhaust gas turbine in accordance with the present invention in which a hydraulic torque converter is arranged between the crankshaft and the transmission or gear connecting the exhaust gas turbine with the driven shaft;

FIGURE 3 is still another embodiment of an internal combustion engine with an exhaust gas turbine in accordance with the present invention wherein the exhaust gas turbine drives a turbo charger, and FIGURE 4 shows a cross-sectional view of an adjustable timing control mechanism.

Referring now to the drawing, wherein like reference numerals are used throughout the various views to designate like parts, and more particularly to FIGURE 1, reference numeral 10 designates the engine housing of the internal combustion engine which encloses or accommodates therein the usual crankshaft 11 which is connected with the cam shaft 13 over a suitable drive connection 12. An adjustable timing control mechanism 14 of any suitable conventional construction is provided between the drive connection 12 and the cam shaft 13 which enables by actuation of the lever 15 to change the angular position of the cam shaft 13 with respect to the drive connection 12 and therewith with respect to the crankshaft 11. Such an adjustable timing control mechanism may, for instance, be constructed as shown in FIGURE 4 wherein the cam shaft 13 is supported in bearings 40 and is prevented from moving in an axial direction by means of the thrust bearing 41. A chain sprocket or gear pinion 43 is freely mounted on the cam shaft 13 but is prevented from moving in an axial direction by means of bearing 41 and collar 44. The front end of the cam shaft 13 is provided with a straight spline 45 and a collar socket 46 is in slidable engagement therewith. This collar socket 46 is provided on the outer diameter thereof with a thread 47 having a relatively steep pitch. The thread 47 is in engagement with a corresponding internal thread in the chain sprocket 43.

The collar socket 46 may be moved in an axial direction by the rotation of lever 15 which is mounted in the housing by means of a shaft 48. A lever 49 is attached to the shaft 48 at the inside of the housing and is provided with a projection 50 that is in engagement with the annular groove 51 provided in the collar socket 46.

When the collar socket 46 is moved in an axial direction by the rotation of shaft 48, it is rotated in relation to the chain sprocket 43 by reason of the threaded engagement thereof with the chain sprocket 43, and the cam shaft 13 is correspondingly rotated. In this manner, the angular relationship between the cams 52, which operate the exhaust valves of the engine, and the engine crankshaft, is altered, whereby also the timing of the opening of the exhaust valve is changed. The drive connection 12 may be of any suitable type, for example, in the form of a belt, chain or mechanical connection of any conventional type, such as a gear connection.

The adjustable timing control mechanism 14 may be of any appropriate conventional construction such as shown in FIG. 4 which enables changing the angular position of the cam shaft 13 with respect to the crankshaft 11 of the engine.

The exhaust gases of the piston-type internal combustion engine reach a gas turbine 17 over a common exhaust manifold 16. After passage through the exhaust gas turbine 17, the exhaust gases pass into the atmosphere through the exhaust pipe 18.

In the embodiment according to FIGURE 1, the output shaft 19 of the exhaust gas turbine drives a gear 22 over a pinion 20 and an intermediate gear 21. The gear 22 is elastically connected with the shaft leading from the flywheel 23 to the flange 24 of the driven shaft in any suitable manner, for example, by means of any conventional elastic coupling 30 such as disclosed in U.S. Patent 2,631,256.

It it is desired, for example, to reduce the total output at the driven side of the flange 24 from a preexisting operating condition, then if this were done in the usual manner, the output at 24 would decrease by reason of the corresponding reduction or throttling of the fuel supply or combustion air supply for the internal combustion engine obtained by means of a conventional selectively adjustable throttle or fuel rack control, whereby the loading of the exhaust gas turbine 17, i.e., the energy supplied to the exhaust gas turbine by means of the exhaust gases, would also decrease to the same extent or to a similar extent. This would result in the operation of the exhaust gas turbine within a considerably more unfavorable range of efficiency as flow devices can operate with relatively good efficiency only over a relatively narrow range.

However, according to the present invention, with a reduction of the overall output of the installation, the adjustable timing control mechanism is so adjusted by means of lever 15 that as a result of an earlier opening of the outlet valves (not shown), exhaust gases which contain an energy content reduced as little as possible with respect to the pre-existing condition reach the exhaust gas turbine 17. The exhaust gas turbine 17 remains subjected to essentially the same load notwithstanding a reduction or decrease in the output of the over-all installation and, therefore, continues to operate with a high degree of efficiency.

The embodiment according to FIGURE 2 is similar to FIGURE 1. However, it includes additionally a hydraulic torque converter 25 which by actuation of a lever 26 may be adjusted to different speed reduction ratios or to a complete separation of the input and output shafts of the torque converter in any suitable manner, for example, by changing the guide blades, the degree of filling, etc. The set of blades of the engine side is connected with the flywheel 23 of the internal combustion engine. Furthermore, a disengageable shifting clutch 28 which may be actuated with the aid of lever 27 is arranged between the exhaust gas turbine 17 and gear or transmission 20, 21 and 22 so as to enable a complete disengagement of the exhaust gas turbine 17 from the driven side or output shaft 24. Such a clutch 28 may, of course, also be provided in a similar manner in the embodiment of FIGURE 1.

Such a clutch 28 is particularly useful during engine-braking of the motor vehicle when the motor vehicle is driven downhill and braking is to take place with the aid of the engine. For if in that case the exhaust gas turbine 17 remained permanently connected to the driven shaft 24, it would continue to transmit a torque to the driven shaft 24 in the absence of a disengageable clutch 28 since the gas turbine 17 continues to be driven by the exhaust gases also under these operating conditions which would have an unfavorable effect on the braking action of the engine by lessening the same.

In the installation according to FIGURE 2, the loading of the exhaust gas turbine 17 may be maintained far-reachingly constant with changes in the overall output produced at the driven shaft at 24 by actuating the adjustable timing control mechanism 14 exactly in the same manner as described in connection with FIGURE 1. However, the installation offers the additional advantage that with low rotational speeds of the driven shaft 24, i.e., with an adjustment of the transmission 25 to a great speed reduction, a particularly high torque can be achieved at the driven shaft 24 since by appropriately actuating the adjustable timing control mechanism 14, the largest feasible amount of energy in the form of exhaust gases is supplied to the exhaust gas turbine 17 which then results in a very large torque exerted by the turbine on the driven shaft 24 with a slowly rotating turbine, or, in the extreme case, even with the turbine standing still due to extreme load conditions.

In the embodiment according to FIGURE 3, the exhaust gas turbine 17 is not mechanically connected with the driven side 24 but serves instead for purposes of driving a turbo-charger 29 which draws-in the combustion air through a funnel 30 and supplies the same over a line 31 to the common inlet manifold 32 disposed on the side of the engine opposite to that of the drawing.

It is also possible in this embodiment to produce a relatively high torque on the driven side or output 24 with lower rotational speeds thereof which in that case also corresponds to lower rotational speeds of the crankshaft 11. This is rendered possible by the adjustment of the adjustable timing control mechanism 14 under such operating conditions of low rotational speeds in such a manner that the exhaust gas turbine 17 is heavily loaded and that, as a result thereof, the turbo-charger 29 supplies a highly compressed combustion air to the engine.

While the lever 15 for adjusting the timing control mechanism may be adjusted manually, it is understood that the lever 15 may also be adjusted automatically, for example, by means of a suitable linkage with the control member such as the gas pedal adjusting the output of the internal combustion engine. Such linkage may be of any appropriate construction to enable the desired results pointed out hereinabove.

The present invention is not limited to the embodiments illustrated herein. For example, a separate cam shaft may be provided for the inlet and outlet valves of the piston-type internal combustion engine whereby only the cam shaft for the outlet valves need to be adjustable for purposes of achieving the intended results.

While I have shown and described several embodiments in accordance with the present invention, it is understood that the same is not limited thereto but is susceptible of many changes and modifications within the scope of a person skilled in the art, and I intend to cover all such changes and modifications as encompassed by the appended claims.

I claim:

1. A variable-speed piston-type internal combustion engine installation of the type in which the speed thereof for a given fuel setting varies in dependence on the load and provided with an exhaust gas turbine having input means and output means and driven by the exhaust gases from the cylinder means of said engine, comprising conduit means for supplying the exhaust gases from said cylinder means to the input means of said turbine, means operatively connected with said output means for transmitting a substantial portion of the energy developed by said turbine as mechanical energy to said engine under all operating conditions thereof, and adjustable control means operatively connected with said engine for adjusting, with a given fuel setting, the operation of said engine during variations in the rotational speed thereof to adjust the supply of said exhaust gases to said turbine and to thereby operate said exhaust gas turbine within a range of loads corresponding to the operation thereof at relatively high efficiency.

2. A variable-speed piston-type internal combustion engine installation of the type in which the speed thereof for a given fuel setting varies in dependence on the load and provided with an exhaust gas turbine having input means and output means and driven by the exhaust gases from the cylinder means of said engine, comprising conduit means for supplying the exhaust gases from said cylinder means to the input means of said turbine, means operatively connected with said output means for transmitting all the energy produced by said turbine to said engine as mechanical energy under all operating conditions thereof, and adjustable control means operatively connected with said engine for adjusting, with a given fuel setting, the operation of said engine during variations in the rotational speed thereof to adjust the supply of said exhaust gases to said turbine and to thereby operate said exhaust gas turbine within a range of loads corresponding to the operation thereof at relatively high efficiency.

3. A piston-type internal combustion engine installation according to claim 2, wherein said engine is provided with output means, and wherein said connecting means provides a constant drive connection between said two output means.

4. A piston-type internal combustion engine installation according to claim 3, wherein said connecting means includes an elastic coupling.

5. A variable-speed piston-type internal combustion engine installation of the type in which the speed thereof for a given fuel setting varies in dependence on the load and provided with an exhaust gas turbine having input means and output means and driven by the exhaust gases from the cylinder means of said engine, comprising conduit means for supplying the exhaust gases from said cylinder means to the input means of said turbine, said engine installation including main output means constituting the main output for supplying torque from the engine installation to a utilization device, means operatively connected between the said two output means for transmitting the energy developed by said turbine from the turbine output means to said main output means, an engine crankshaft in said engine, and change speed transmission means operatively connected between said crankshaft and said main output means to vary the speed reduction therebetween by said change speed transmission means.

6. A piston-type internal combustion engine installation according to claim 5, wherein said change speed transmission means is provided with input and output sides and is a hydraulic torque converter with means to vary the amount of slippage between the input and output sides thereof.

7. A variable-speed piston-type internal combustion engine installation of the type in which the speed thereof for a given fuel setting varies in dependence on the load and provided with an engine output and with an exhaust gas turbine having input means and output means and driven by the exhaust gases from the cylinder means of said engine, comprising conduit means for supplying the exhaust gases from said cylinder means to the input means of said turbine, means operatively connected with said output means for transmitting the energy developed by said turbine to said engine output, and adjustable control means operatively connected with said engine for adjusting, with a given fuel setting, the operation of said engine during variations in the rotational speed thereof to adjust the supply of said exhaust gases to said turbine and to thereby operate said exhaust gas turbine within a range of loads corresponding to the operation thereof at relatively high efficiency, said connecting means for transmitting the energy developed by said turbine to said engine including a mechanical connection between the output means of said turbine and said engine output to transmit a substantial portion of the energy developed in said turbine as mechanical energy to said engine at all operating conditions thereof, and disengageable clutch means to disengage the output of said turbine from that of said engine.

8. A variable-speed piston-type internal combustion engine installation of the type in which the speed thereof, for a given fuel setting, varies in dependence on the load and provided with an exhaust gas turbine having input means and output means and driven by the exhaust gases from the cylinder means of said engine, comprising conduit means for supplying the exhaust gases from said cylinder means to the input means of said turbine, means operatively connected with said output means for transmitting the energy developed by said turbine to said engine, adjustable control means operatively connected with said engine for adjusting, with a given fuel setting, the operation of said engine during variations in the rotational speed thereof to adjust the supply of said exhaust gases to said turbine and to thereby operate said exhaust gas turbine within a range of loads corresponding to the operation thereof at relatively high efficiency, said engine including an engine crankshaft and engine output shaft means operatively connected with said engine crankshaft and constituting the main engine output, said means for transmitting the energy developed by said exhaust gas turbine to said engine including a mechanical connection between said engine output means and the output means of said turbine, change-speed transmission means operatively connected between said crankshaft and said engine output means for selectively varying the speed reduction produced thereby, and means for increasing the speed reduction ratio in said change-speed transmission means while adjusting said adjustable control means for maximum loading of said turbine to produce a high torque during low rotational speeds of said engine output means.

9. A piston-type internal combustion engine installation according to claim 8, wherein said change-speed transmission means is operative to provide a complete separation of said crankshaft from said output means.

10. A variable-speed piston-type internal combustion engine installation of the type in which the speed thereof for a given fuel setting varies in dependence on the load and provided with an exhaust gas turbine having input means and output means and driven by the exhaust gases from the cylinder means of said engine, with conduit means for supplying the exhaust gases from said cylinder means to the input means of said turbine, and with engine valve means controlling the supply of said exhaust gases to said turbine, comprising means operatively connected with said output means for transmitting a substantial portion of the energy developed by said exhaust gas turbine as mechanical energy to said engine under all operating conditions thereof, and adjustable control means operatively connected with said engine valve means for adjusting, with a given fuel setting, the same during variation in the rotational speed of said engine to thereby adjustably control the supply of said exhaust gases to said turbine and to thereby operate said exhaust gas turbine within a range of loads corresponding to operation thereof at relatively high efficiency.

11. A piston-type internal combustion engine installation provided with an engine output according to claim 10, wherein said means operatively connected with the output means of said exhaust gas turbine provides an essentially constant drive connection between said output means and the said engine output.

12. A variable-speed piston-type internal combustion engine installation of the type in which the speed thereof for a given fuel setting varies in dependence on the load, said internal combustion engine installation having principal output shaft means for supplying engine torque to a load and provided with an exhaust gas turbine having input means and output means and driven by the exhaust gases from the cylinder means of said engine, comprising conduit means for supplying the exhaust gases from said cylinder means to the input means of said turbine, means operatively connected with said output means for effectively adding essentially all the energy developed by said turbine as mechanical energy to that produced by said engine in said principal output shaft means, and adjustable control means operatively connected with said engine for adjusting with a given fuel setting, the operation of said engine during variations in the speeds thereof to adjust the supply of said exhaust gases to said turbine and to thereby operate said exhaust gas turbine within a range of loads corresponding to the operation thereof at relatively high efficiency.

13. A piston-type internal combustion engine installation of the variable speed type in which the speed, for a given fuel setting, varies in dependence on the load and having power output shaft means forming the principal engine output and provided with an exhaust gas turbine having input means and output means and driven by the exhaust gases from the cylinder means of said engine, comprising conduit means for supplying the exhaust gases from said cylinder means to the input means of said turbine, means operatively connecting said output means with said power output shaft means for transmitting essentially the entire energy developed by said turbine to said power output shaft means as mechanical energy substantially at all operating conditions of said engine, engine speed responsive control means operatively connected with said engine to vary with a given fuel setting, the supply of exhaust gases to said turbine during variations of the rotative speed of said engine in such a manner that the turbine operates within a range of loads at which the efficiency thereof is relatively high, said connecting means including disengageable clutch means to selectively disengage the output means of said turbine from said power output shaft means.

14. A variable-speed piston type internal combustion engine installation of the type in which the speed, for a given fuel setting, varies in dependence on the load and having a crankshaft and provided with an exhaust gas turbine having input means and output means and driven by the exhaust gases from the cylinder means of said engine, comprising conduit means for supplying the exhaust gases from said cylinder means to the input means of said turbine, main engine output means, means operatively connecting said crankshaft with said main engine output means including change-speed tranmission means for selectively varying the transmission ratio therebetween, means operatively connecting said turbine output means with said main output means for transmitting energy developed by said turbine to said main output means, and adjustable control means operatively connected with said engine for adjusting with a given fuel setting, the operation thereof during variations in the rotational speed of said engine to adjust the supply of said exhaust gases to said turbine and to thereby operate said exhaust gas turbine within a range of loads corresponding to the operation thereof at relatively high efficiency, said connecting means operatively connecting the turbine output means with said main engine output means including a mechanical connection to transmit essentially the entire energy developed in said turbine as mechanical energy to said engine at all operating conditions thereof, and said last-mentioned connecting means being connected with said main engine output means behind said change-speed transmission means as seen from the engine.

References Cited in the file of this patent
UNITED STATES PATENTS

| | | |
|---|---|---|
| 2,097,883 | Johansson | Nov. 2, 1937 |
| 2,278,181 | Lieberherr | Mar. 31, 1942 |
| 2,401,188 | Prince | May 28, 1946 |
| 2,542,539 | Kuhrt et al. | Feb. 20, 1951 |
| 2,570,101 | Couling | Oct. 2, 1951 |
| 2,585,029 | Nettel | Feb. 12, 1952 |
| 2,585,968 | Schneider | Feb. 19, 1952 |
| 2,607,189 | Chilton | Aug. 19, 1952 |
| 2,656,675 | Coar | Oct. 27, 1953 |
| 2,761,276 | Kollmann | Sept. 4, 1956 |
| 2,820,339 | Grieshaber et al. | Jan. 21, 1958 |